United States Patent
Quiros Perez et al.

(10) Patent No.: US 8,540,299 B2
(45) Date of Patent: Sep. 24, 2013

(54) CONVERTIBLE SPACE SYSTEM FOR INTERIOR CARGO AREA OF A VEHICLE

(75) Inventors: Flor Elena Quiros Perez, Mexico City (MX); Maurice James Gisler, Rochester Hills, MI (US); Mario Garcia Garcia, Toluca Estado De (MX)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/596,574

(22) Filed: Aug. 28, 2012

(65) Prior Publication Data
US 2013/0076056 A1    Mar. 28, 2013

Related U.S. Application Data

(60) Provisional application No. 61/538,883, filed on Sep. 25, 2011.

(51) Int. Cl.
*B60R 11/06* (2006.01)
(52) U.S. Cl.
USPC .................. 296/37.14; 296/37.8; 224/400
(58) Field of Classification Search
USPC ............. 296/24.3, 24.33, 37.8, 37.14, 37.16; 224/400, 497, 545, 549
See application file for complete search history.

(56) References Cited

U.S. PATENT DOCUMENTS

| | | | | |
|---|---|---|---|---|
| 2,380,557 A | * | 7/1945 | Terry | 296/37.6 |
| 2,972,498 A | * | 2/1961 | Kelley | 296/204 |
| 3,598,273 A | * | 8/1971 | Rau et al. | 220/1.5 |
| 4,139,229 A | * | 2/1979 | Cooper | 296/165 |
| 4,256,340 A | * | 3/1981 | Dunchock | 296/37.15 |
| 4,620,741 A | * | 11/1986 | Hanemaayer | 296/37.14 |
| 4,696,369 A | * | 9/1987 | Dodrill | 181/141 |
| 5,967,585 A | * | 10/1999 | Sprague | 296/39.1 |
| 6,017,074 A | * | 1/2000 | Biskup | 296/39.1 |
| 6,050,202 A | * | 4/2000 | Thompson | 108/44 |
| 6,435,587 B1 | * | 8/2002 | Flowerday et al. | 296/37.8 |
| 6,585,306 B1 | * | 7/2003 | Smith et al. | 296/24.44 |
| 6,644,709 B2 | * | 11/2003 | Inagaki et al. | 296/37.16 |
| 6,854,400 B2 | * | 2/2005 | Sullivan | 105/372 |
| 6,863,328 B2 | * | 3/2005 | Kiester et al. | 296/37.6 |
| 6,871,895 B2 | * | 3/2005 | Kiester et al. | 296/26.09 |
| 6,899,374 B1 | * | 5/2005 | Heard | 296/155 |
| 7,232,172 B2 | * | 6/2007 | Kiester et al. | 296/39.2 |
| 7,549,380 B2 | * | 6/2009 | Sullivan | 105/372 |
| 7,559,594 B2 | * | 7/2009 | McMillen | 296/65.09 |
| 7,641,252 B2 | * | 1/2010 | Sturt et al. | 296/24.34 |
| 7,914,059 B2 | * | 3/2011 | Carnevali | 296/24.34 |
| 8,136,217 B2 | * | 3/2012 | Carnevali | 29/525.01 |
| 8,157,310 B2 | * | 4/2012 | Carnevali | 296/24.34 |
| 8,215,688 B2 | * | 7/2012 | Hipshier et al. | 296/24.34 |
| 8,322,768 B2 | * | 12/2012 | Carnevali | 296/24.34 |
| 2002/0089203 A1 | * | 7/2002 | Flowerday et al. | 296/37.8 |

(Continued)

*Primary Examiner* — Lori Lyjak
(74) *Attorney, Agent, or Firm* — Quinn Law Group PLLC

(57) ABSTRACT

A vehicle includes a convertible space system that is integrated into a floor of an interior cargo area. The convertible space system includes a pair of panels that are moveable between a stowed position and a deployed position. When in the deployed position, the pair of panels are extended and integrally positioned on the floor to define a primary load bearing surface. When in the stowed position, the pair of panels are collapsed and positioned on the floor to define vertically extending lateral boundary walls for the cargo area, and to expose a secondary load bearing surface disposed below the primary load bearing surface, thereby increasing the effective height of the interior cargo area.

11 Claims, 3 Drawing Sheets

(56) References Cited

U.S. PATENT DOCUMENTS

| | | | |
|---|---|---|---|
| 2003/0057724 A1* | 3/2003 | Inagaki et al. | 296/37.8 |
| 2003/0168876 A1* | 9/2003 | Kiester et al. | 296/39.2 |
| 2003/0217670 A1* | 11/2003 | Sullivan | 105/404 |
| 2004/0056058 A1* | 3/2004 | Ryan | 224/498 |
| 2004/0146373 A1* | 7/2004 | Kiester et al. | 410/129 |
| 2005/0036849 A1* | 2/2005 | Kiester et al. | 410/129 |
| 2007/0062003 A1* | 3/2007 | Sullivan | 16/221 |
| 2007/0065264 A1* | 3/2007 | Sturt et al. | 414/545 |
| 2007/0216185 A1* | 9/2007 | McMillen | 296/64 |
| 2008/0169674 A1* | 7/2008 | Giles | 296/183.1 |
| 2008/0315606 A1* | 12/2008 | Sturt et al. | 296/24.34 |
| 2010/0090488 A1* | 4/2010 | Carnevali | 296/24.34 |
| 2010/0090489 A1* | 4/2010 | Carnevali | 296/24.34 |
| 2010/0090490 A1* | 4/2010 | Carnevali | 296/24.34 |
| 2010/0090491 A1* | 4/2010 | Hipshier et al. | 296/24.34 |
| 2010/0283277 A1* | 11/2010 | Carnevali | 296/24.34 |
| 2012/0169089 A1* | 7/2012 | Rawlinson et al. | 296/193.08 |
| 2013/0008930 A1* | 1/2013 | Hipshier et al. | 224/275 |
| 2013/0009417 A1* | 1/2013 | Hipshier et al. | 296/24.34 |
| 2013/0009418 A1* | 1/2013 | Hipshier et al. | 296/24.34 |

* cited by examiner

CONVERTIBLE SPACE SYSTEM FOR INTERIOR CARGO AREA OF A VEHICLE

CROSS-REFERENCE TO RELATED APPLICATIONS

This application claims the benefit of U.S. Provisional Patent Application Ser. No. 61/538,883, filed on Sep. 25, 2011, the disclosure of which is hereby incorporated by reference.

TECHNICAL FIELD

The invention generally relates to a vehicle having an interior cargo area, and more specifically to an integrated convertible space system therefore.

BACKGROUND

Vehicles, such as a Sport Utility Vehicle (SUV) or a van, may include a rear cargo area that is generally defined by a roof of the vehicle above, a floor of the vehicle below, lateral opposing sidewalls of the vehicle, a liftgate at the rear of the vehicle, and a backrest of a passenger seat. The maximum height of the cargo area is defined by the distance between the floor and the roof of the vehicle. Objects placed in the cargo area are generally free to move or slide around within the cargo area, and are not restrained and/or secured except for the features of the vehicle described above that define the cargo area.

SUMMARY

A vehicle is provided. The vehicle includes a body having a roof, a floor and opposing lateral sidewalls extending between the roof and the floor. The roof, the floor and the opposing lateral sidewalls cooperate to define an interior cargo area therebetween. The vehicle includes a convertible space system having a pair of panels that are moveable between a stowed position and a deployed position. When in the deployed position, the pair of panels is extended to define a substantially flat structure and integrated into the floor of the body to define a primary load bearing surface. When in the stowed position, the pair of panels is collapsed and positioned on the floor to define substantially vertical lateral boundary walls, and to expose a secondary load bearing surface disposed vertically below the primary load bearing surface.

Accordingly, the pair of panels of the convertible space system may be positioned in the deployed position, thereby concealing the secondary load bearing surface. The pair of panels provides and define the primary load bearing surface upon which objects may be placed. The maximum height of the cargo area is then the vertical difference between the primary load bearing surface and the roof. The pair of panels may be re-positioned into the stowed position, when desired to expose the secondary load bearing surface. When the secondary load bearing surface is exposed, the maximum height of the cargo area is then the vertical difference between the second storage surface and the roof. Accordingly, the maximum height of the cargo area may be increased by re-positioning the pair of panels from the deployed position, thereby exposing the secondary load bearing surface.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," "rearward," "forward," "upper," "lower," etc., are used descriptively for the figures, and do not represent limitations on the scope of the invention, as defined by the appended claims.

Referring to the Figures, wherein like numerals indicate like parts throughout the several views, a vehicle is generally shown at 20. The vehicle 20 may include any vehicle 20 that defines an interior cargo area 22, such as but not limited to a Sport Utility Vehicle (SUV), cargo van, or some other similarly configured vehicle.

Figure 1:
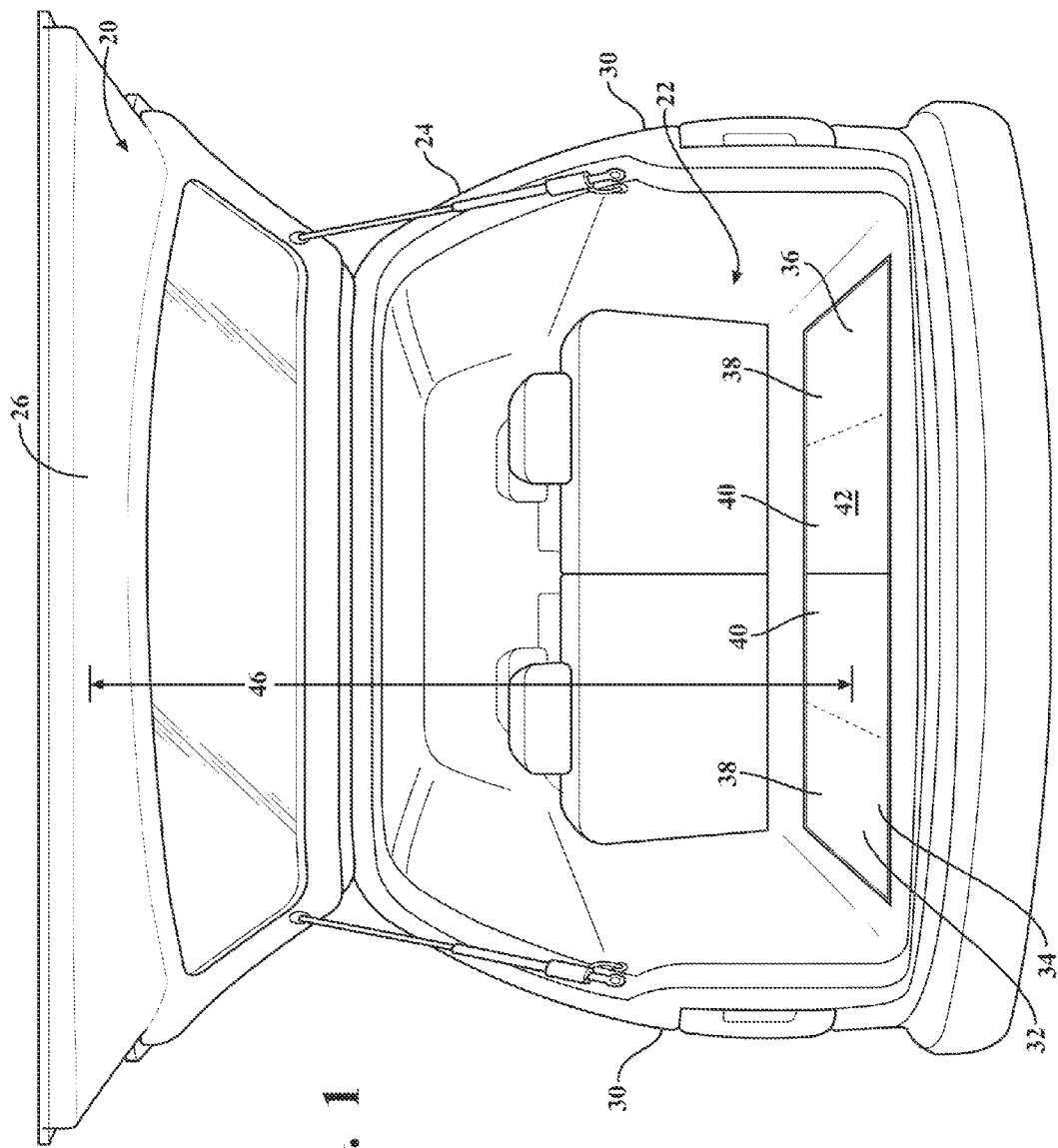
FIG. 1 is a schematic perspective view of an interior cargo area of a vehicle showing a convertible space system in a deployed position.
Figure 2:
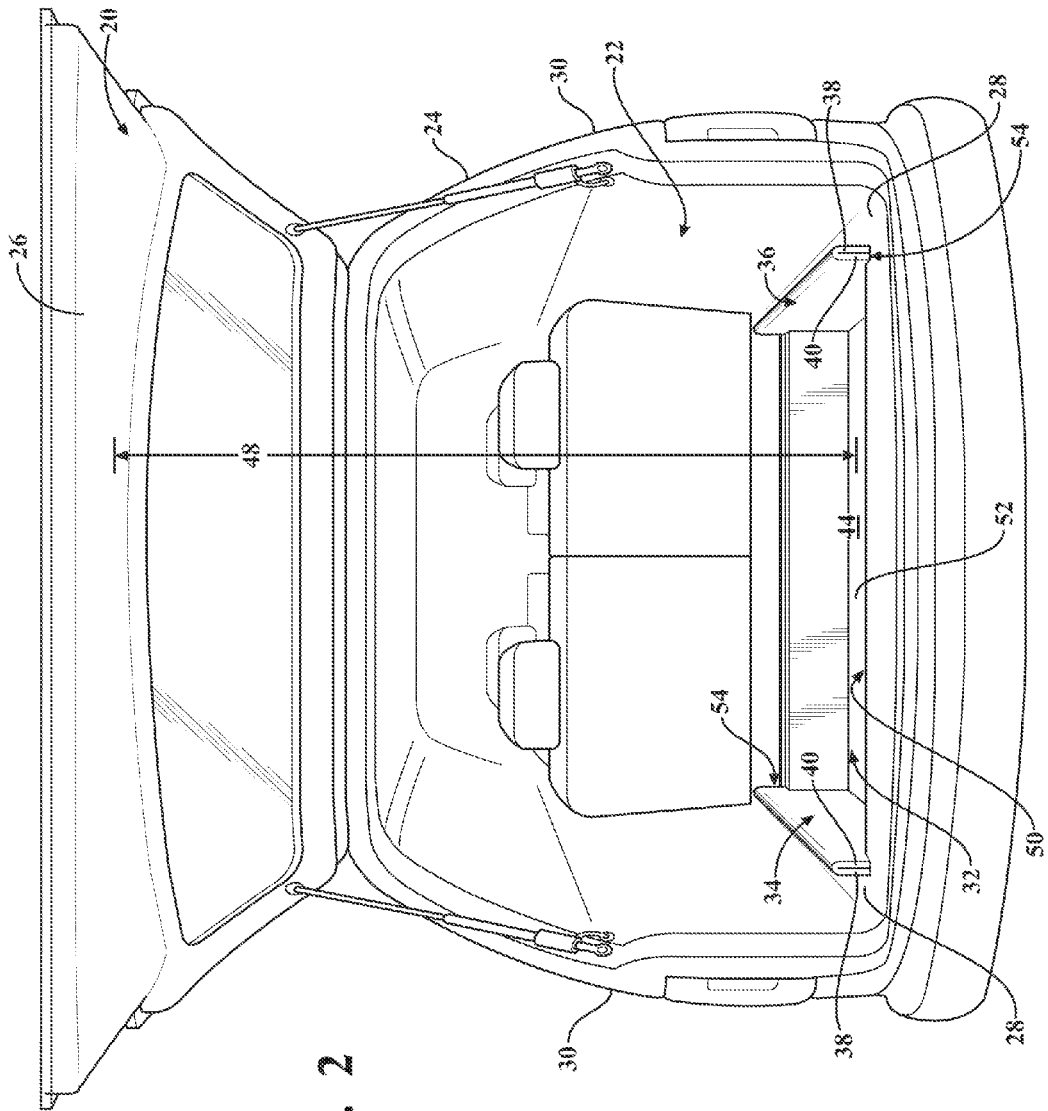
FIG. 2 is a schematic perspective view of the interior cargo area of the vehicle showing the convertible space system in a stowed position.

Referring to FIGS. 1 and 2, the vehicle 20 includes a body 24. The body 24 includes a roof 26, a floor 28 and opposing lateral sidewalls 30. The opposing lateral sidewalls 30 extend between the roof 26 and the floor 28. The roof 26, the floor 28 and the opposing lateral sidewalls 30 cooperate to define the interior cargo area 22 therebetween.

The vehicle 20 includes a convertible space system 32. The convertible space system 32 includes a pair of panels 34, 36, i.e., a first panel 34 and a second panel 36. Each of the pair of panels 34, 36 includes a first section 38 and a second section 40. The first section 38 and the second section 40 are attached together by a hinge 41. The hinge 41 pivotably couples the first section 38 and the second section 40 together for relative pivotable movement therebetween. Accordingly, the first section 38 and the second section 40 of each pair of panels 34, 36 may be pivoted relative to each other to lay side-by-side, such as shown in FIG. 1, or to be folded together one against the other, such as shown in FIG. 2.

The convertible space system 32, and more specifically the pair of panels 34, 36, is moveable between a deployed position, shown in FIG. 1, and a stowed position, shown in FIG. 2. When in the deployed position, the first section 38 and the second section 40 of the pair of panels 34, 36 are expanded to lay side-by-side to define a substantially flat structure, and integrated into the floor 28 of the body 24 to define a primary load bearing surface 42. When the pair of panels 34, 36 is disposed in the deployed position, the maximum height 46 of the cargo area 22 is the vertical difference between the primary load bearing surface 42 and the roof 26 of the body 24. When in the stowed position, the first section 38 and the second section 40 of the pair of panels 34, 36 are collapsed so as to be folded together and positioned on the floor 28 to define substantially vertical boundary walls for the cargo area 22. When removed from the deployed position, the pair of panels 34, 36 exposes a secondary load bearing surface 44. The secondary load bearing surface 44 is disposed vertically below the primary load bearing surface 42. When the pair of panels 34, 36 is removed from the deployed position, thereby exposing the secondary load bearing surface 44, the maximum height 48 of the cargo area 22 is the vertical difference between the secondary load bearing surface 44 and the roof 26 of the body 24.

Figure 3:
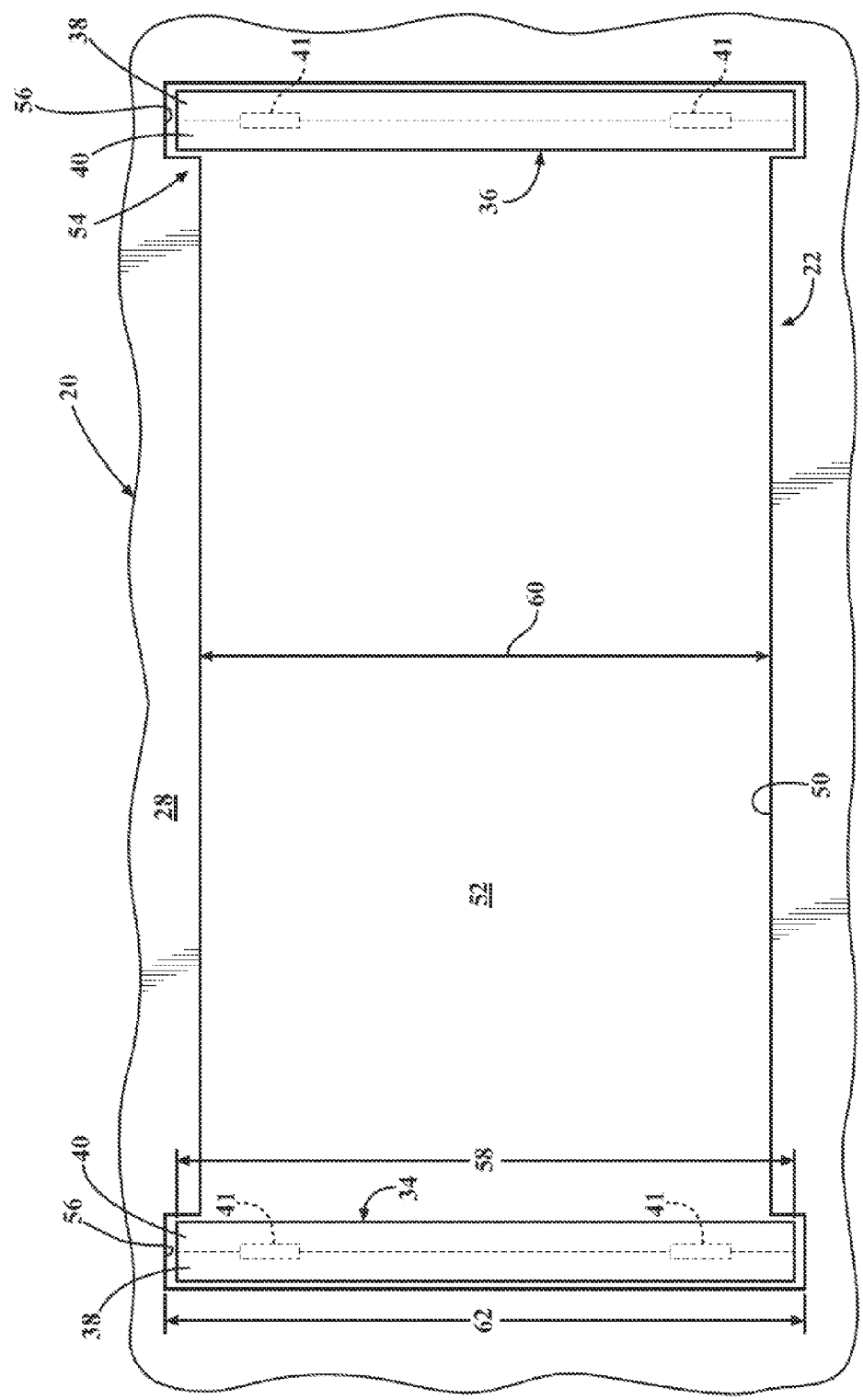
FIG. 3 is a schematic partial plan view of the interior cargo area of the vehicle showing the convertible space system in the stowed position.

Referring to FIG. 3, each section 38, 40 of each of the pair of panels 34, 36 is constructed from a composite or plastic material, and includes a honeycomb like structure, thereby providing a lightweight yet strong structure. One surface of each of the pair of panels 34, 36 defines the primary load bearing surface 42, which may be upholstered, i.e., covered with a carpet material or the like to match the interior of the vehicle 20. The floor 28 of the vehicle 20 may be formed to receive the substantially flat structure of the collapsed pair of panels 34, 36 in a generally seamless manner, so as to provide a substantially flat primary load bearing surface 42. For example, the floor 28 of the vehicle 20 may be formed to define a downwardly extending pocket 50 into which the substantially flat structure of the pair of panels 34, 36 extends over when in the deployed position. A lower surface 52 of the pocket 50 defines the secondary load bearing surface 44, which is exposed upon the removal of the pair of panels 34, 36. Accordingly, the convertible space system 32 allows the configuration of the cargo area 22 to be converted to accommodate a wide variety of cargo.

Referring to FIG. 3, the floor 28 and/or the downwardly extending pocket 50 of the vehicle 20 may include retention features 54, such as grooves, clips or other similar devices that are capable of securing the pair of panels 34, 36 in the stowed position, i.e., the substantially vertical position. For example, the retention feature may include a pair of grooves 56 disposed on laterally opposite sides of the pocket 50. Each of the pair of grooves 56 is shaped to receive one of the pair of panels 34, 36 therein when disposed in the stowed position. As such, each of the pair of panels 34, 36 includes a panel length 58, and the pocket defines a pocket length 600. The panel length 58 is greater than the pocket length 60 so that the floor may support the pair of panels 34, 36 over the pocket 50. However, each of the grooves 56 includes a groove length 62. The groove length 62 is greater than the panel length 58 so that the panels 34, 36 fit within the grooves 56 for storage in the stowed position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
a body having a roof, a floor vertically spaced from the roof, and opposing lateral sidewalls extending between the roof and the floor, with the roof, the floor and the opposing lateral sidewalls cooperating to define an interior cargo area therebetween; and
a convertible space system having a pair of panels moveable between a deployed position in which the pair of panels are extended to define a substantially flat structure integrated into the floor to define a primary load bearing surface, and a stowed position in which the pair of panels are collapsed and positioned to expose a secondary load bearing surface and to define substantially vertical boundary walls adjacent to the secondary load bearing surface;
wherein the secondary load bearing surface is disposed vertically below the primary load bearing surface.

2. A vehicle as set forth in claim 1 wherein the floor defines a pocket having a lower surface disposed vertically below the primary load bearing surface, wherein the lower surface of the pocket defines the secondary load bearing surface.

3. A vehicle as set forth in claim 2 wherein each of the pair of panels includes a first section and a second section attached together by a hinge for pivotal movement relative to each other.

4. A vehicle as set forth in claim 3 wherein the floor defines a retention feature for securing each of the pair of panels when in the stowed position in a vertically upright position with the first section and the second section of each of the pair of panels folded adjacent each other.

5. A vehicle as set forth in claim 4 wherein the retention feature includes a pair of grooves disposed laterally across the pocket, with each of the pair of grooves formed by the pocket and shaped to receive one of the pair of panels therein when disposed in the stowed position.

6. A vehicle as set forth in claim 5 wherein each of the panels includes a panel length and the pocket defines a pocket length, wherein the panel length is greater than the pocket length such that the floor supports the pair of panels over the pocket when the pair of panels is disposed in the deployed position.

7. A vehicle as set forth in claim 6 wherein each of the pair of grooves defines a groove length measured parallel with the pocket length, and wherein the groove length is greater than the panel length such that the pair of panels fit within the grooves.

8. A vehicle as set forth in claim 7 wherein the interior cargo area defines a first height between the roof and the primary load bearing surface when the pair of panels of the convertible space system are disposed in the deployed position, and wherein the interior cargo area defines a second height between the roof and the secondary load bearing surface when the pair of panels of the convertible space system are disposed in the stowed position, wherein the second height is greater than the first height.

9. A vehicle comprising:
a body having a floor at least partially defining an interior cargo area;
wherein the floor defines a primary load bearing surface and a pocket having a lower surface disposed vertically below the primary load bearing surface, wherein the lower surface of the pocket defines a secondary load bearing surface vertically spaced below the primary load bearing surface;
a convertible space system having a pair of panels moveable between a deployed position in which the pair of panels are extended to define a substantially flat structure integrated into the floor to further define the primary load bearing surface, and a stowed position in which the pair of panels are collapsed and positioned to expose the secondary load bearing surface;
wherein each of the pair of panels includes at least a first section and a second section attached together by a hinge for pivotal movement relative to each other; and
wherein the pocket includes a pair of grooves disposed laterally across the pocket from each other, with each of the pair of grooves formed by the pocket and shaped to receive one of the pair of panels therein in a vertically upright position, with the first section and the second section of each of the pair of panels folded adjacent each other, when disposed in the stowed position.

10. A vehicle as set forth in claim 9 wherein each of the panels includes a panel length and the pocket defines a pocket length, wherein the panel length is greater than the pocket length such that the floor supports the pair of panels over the pocket when the pair of panels is disposed in the deployed position.

11. A vehicle as set forth in claim 10 wherein each of the pair of grooves defines a groove length measured parallel with the pocket length, and wherein the groove length is greater than the panel length such that the pair of panels fit within the grooves.

\* \* \* \* \*